United States Patent [19]

Glaser, Jerry

[11] 4,451,163
[45] May 29, 1984

[54] FOIL BEARING MOUNTING CARRIER

[75] Inventor: Glaser, Jerry, Playa del Rey, Calif.

[73] Assignee: The Garrett Corporation, Los Angeles, Calif.

[21] Appl. No.: 394,077

[22] Filed: Jul. 1, 1982

[51] Int. Cl.³ .............................................. F16C 32/06
[52] U.S. Cl. ................................................... 384/106
[58] Field of Search ................. 384/99, 100, 103, 104, 384/105, 106, 119, 124, 125, 215

[56] References Cited

U.S. PATENT DOCUMENTS

| | | | |
|---|---|---|---|
| 3,366,427 | 1/1968 | Silver et al. | 308/121 |
| 3,375,046 | 3/1968 | Marley | 308/164 |
| 3,382,014 | 5/1968 | Marley | 308/9 |
| 3,467,451 | 9/1969 | Marley | 384/215 |
| 3,511,544 | 5/1970 | Marley | 308/3 |
| 3,615,121 | 10/1971 | Barnett et al. | 308/9 |
| 3,747,997 | 7/1973 | Winn | 308/9 |
| 3,809,443 | 5/1974 | Cherubim | 308/9 |
| 3,893,733 | 7/1975 | Silver et al. | 308/9 |
| 3,902,772 | 9/1975 | Spate | 308/217 X |
| 4,153,315 | 5/1979 | Silver et al. | 308/9 |
| 4,178,046 | 12/1979 | Silver et al. | 308/9 |
| 4,262,975 | 4/1981 | Heshmat et al. | 308/9 |

*Primary Examiner*—Stuart S. Levy
*Assistant Examiner*—David Werner
*Attorney, Agent, or Firm*—J. Henry Muetterties; A. J. Miller; J. W. McFarland

[57] ABSTRACT

A tubular foil bearing carrier, upon which a plurality of individual compliant foils are mounted, is disposed between two relatively rotatable journal bearing elements. The bearing carrier includes at least one circumferential row of alternating slots and bars with individual hairpin foils, having an integral underfoil and overfoil, mounted thereon.

18 Claims, 9 Drawing Figures

FOIL BEARING MOUNTING CARRIER

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a complaint material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the complaint foils between the relatively movable bearing elements, a number of mounting means have been devised. The most common practice, as exemplified in U.S. Pat. Nos. 3,366,427, 3,375,046 and 3,615,121, is to attach a rod or bar to one end of the foil which can then be retained in a slot or groove in one of the relatively movable bearing elements. Alternately, as exemplified in U.S. Pat. Nos. 3,382,014 and 3,809,433, a plurality of overlapping foils may be individually mounted on a foil base such as by spot welds. The base would then be frictionally held against one of the relatively movable bearing elements. Individual foils may also be fastened directly to one of the movable bearing elements as illustrated in U.S. Pat. No. 4,262,975. Further a lip or projection at one end of the foil may be restrained in a slot or groove in one of the relatively movable elements. Examples of this type of mounting can be found in U.S. Pat. Nos. 3,511,544, 3,747,997, 3,809,443 and 3,382,014. Individual foils have also been mounted intermediate the ends thereof as described in U.S. Pat. No. 4,178,046.

In order to establish stability of the foils in most of these prior mounting means, a substantial pre-load is required on the foil. That is, the individual foils must be loaded against the relatively movable bearing element opposed to the bearing element upon which the foils are mounted. It has been conventional to provide compliant stiffener elements or underfoils beneath the foil elements to supply this required pre-load as exemplified in U.S. Pat. Nos. 3,893,733 and 4,153,315.

SUMMARY OF THE INVENTION

A foil bearing carrier, upon which a plurality of individual compliant foils are mounted, is disposed between two relatively movable journal bearing elements with means provided to prevent movement of the carrier with respect to one of the bearing elements. The carrier may include at least one circumferential row of alternating slots and bars with individual hairpin foils snapped over the bars and extending into the slots and overlapping an adjacent foil. The shorter underfoil portion of the hairpin foil may be spring-like to serve as a foil stiffener. In an alternate embodiment, the foil stiffener can be formed as part of the bearing carrier.

DETAILED DESCRIPTION OF THE PREFERRED EMBODIMENTS

Figure 1:
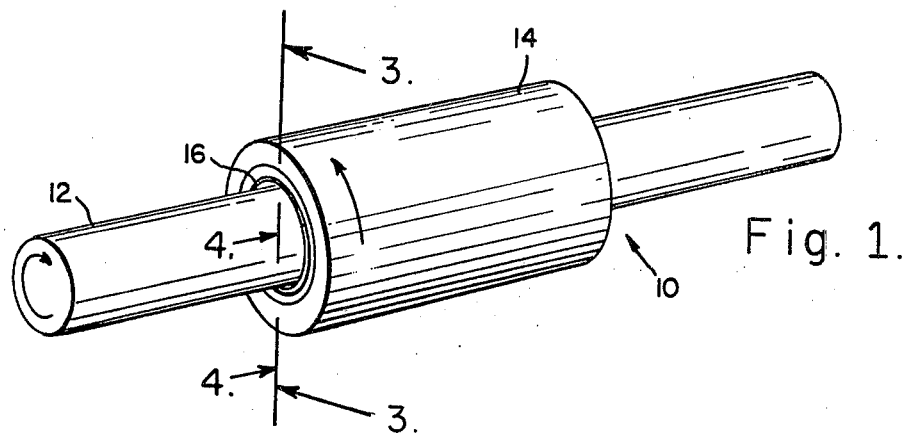
FIG. 1 is a perspective view of a foil journal bearing including a foil bearing carrier.

Referring now to FIG. 1, there is illustrated a foil journal bearing 10 having a shaft 12 rotatably disposed with respect to a bushing 14. Disposed between the shaft 12 and bushing 14 is a foil bearing carrier 16. Arrows on the end of the shaft 12 and the exterior of the bushing 14 indicate the direction of relative rotation between the shaft and bushing. It is not necessary, however, that both the shaft and the bushing rotate; one of the shaft or the bushing may be stationary. It is only necessary that the relative rotation between the shaft and the bushing be in the direction indicated.

Figure 2:
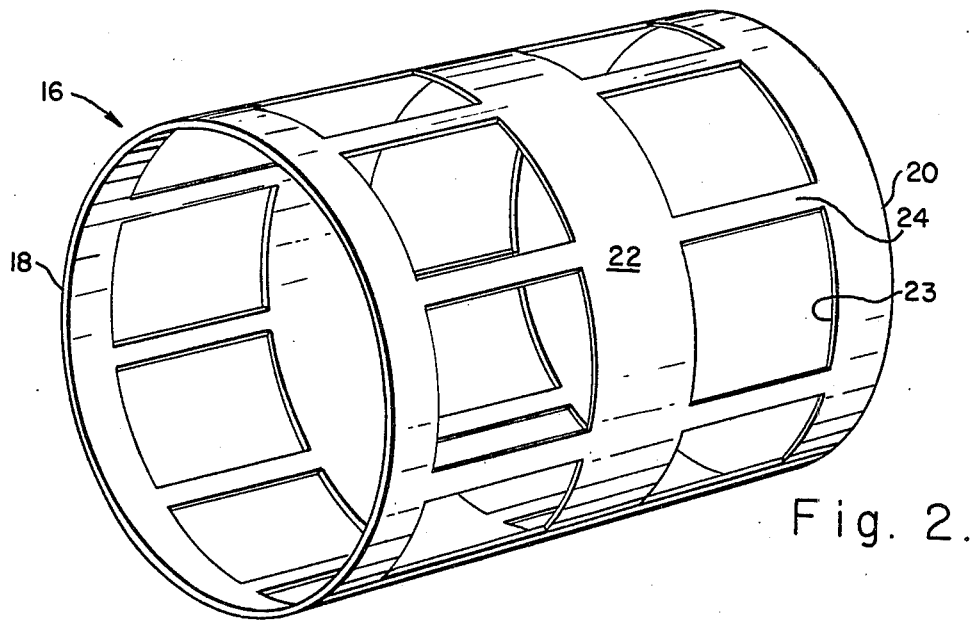
FIG. 2 is an enlarged perspective view of the foil bearing carrier.

As more clearly illustrated in FIG. 2, the bearing carrier 16 is generally of a thin-walled tubular structure having two circumferential rows of slots 23. This leaves tubular carrier rims 18 and 20 disposed on either side of a central tubular rim 22 with a plurality of axially extending bars 24 joining the central section 22 with the rims 18 and 20.

Figure 3:
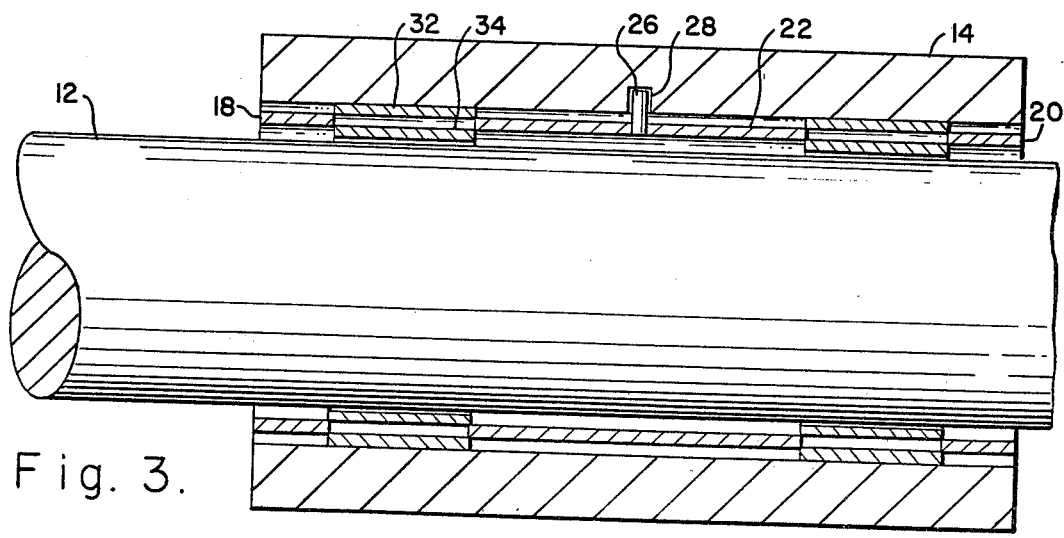
FIG. 3 is an enlarged longitudinal cross-sectional view of the foil journal bearing of FIG. 1 taken along line 3—3.

As best shown in FIG. 3, the foil bearing carrier 16 is disposed around the shaft 12 inside the bushing 14 and is restrained from axial and rotational movement therein by means of pin 26 which radially extends from the central tubular rim 22 of the carrier 16 into a hole 28 in the bushing 14. Consequently, the carrier 16 is compliantly movable radially relative to the bushing 14.

Figure 4:
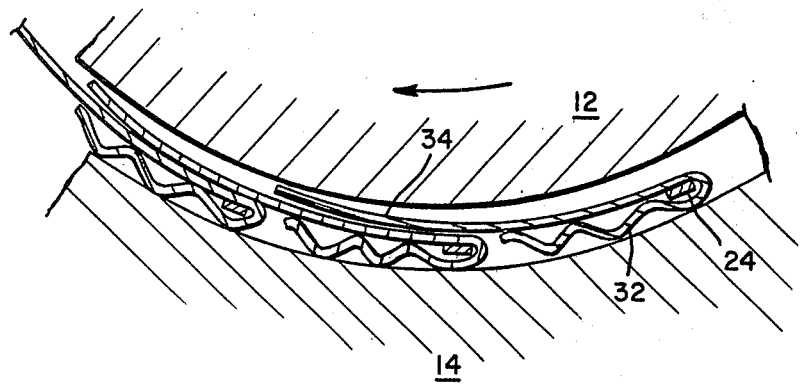
FIG. 4 is an enlarged transverse cross-sectional view of a portion of the foil journal bearing of FIG. 1 taken along line 4—4.
Figure 5:
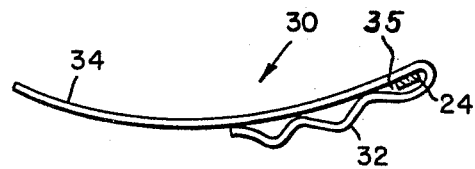
FIG. 5 is a side view in the axial direction of an individual hairpin foil and bearing carrier bar.

Disposed over the axially extending bars 24 in the bearing carrier 16 are individual hairpin foils 30 which are formed of a thin compliant material such as a metal. Further examination of FIGS. 3 and 4 in conjunction with FIG. 5 will show that the hairpin foils 30 are generally J-shaped in transverse cross section and extend both axially and circumferentially. Each of the hairpin foils comprise an elongate overfoil 34 in a generally arcuate shape. The hairpin foils are bent back upon themselves to define a shorter underfoil 32. In order to provide spring-like compliance for the bearing 10, the underfoil 32 may be wavy or a waveform as illustrated having alternating ridges and grooves. The waveform of underfoil 32 in conjunction with the compliant material from which the foils 30 are made allows the foils to distort resiliently in response to radially directed forces between the shaft 12 and bushing 14. Further to such resilient radial distortion, the underfoil 32 of a foil elongates or contracts with the ridges and grooves thereof engaging the bushing 14 and the overfoil 34 of the foil. Consequently, the underfoil 32 provides frictional damping to stabilize the foil and to damp vibration of shaft 12 or bushing 14. Other spring-like configurations may also be used for the underfoil portion 32. The overfoil 34 and portion 32 cooperate to define an axially extending pocket 35 wherein is received a bar 24 of the carrier 16. Viewing FIG. 4, it will be seen that the overfoils 34 of adjacent hairpin foils 30 overlap as illustrated. Thus, the underfoil 32 of each foil 30 compliantly supports and overlapping part of the overfoil 34 of a next adjacent foil.

Figure 6:
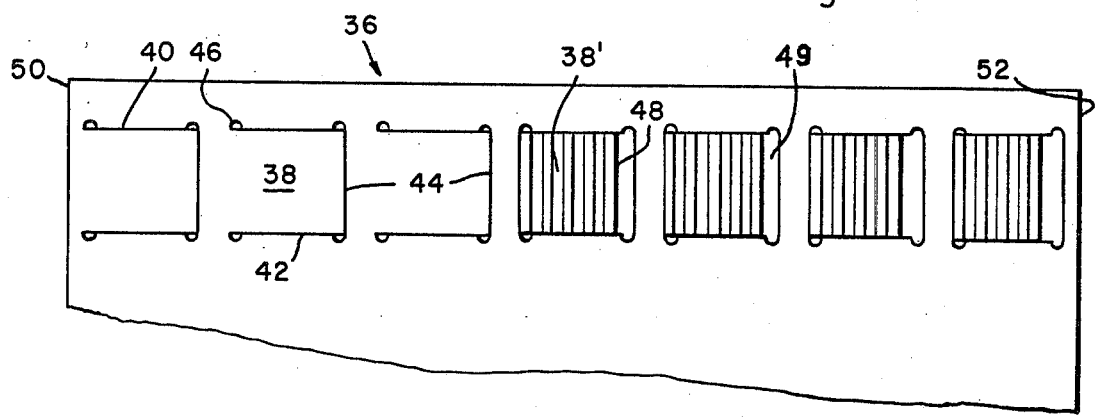
FIG. 6 is a plan view of an alternate bearing carrier shown flat during fabrication thereof.

In the alternate embodiment of FIGS. 6 through 9, the stiffening element or underfoil is incorporated into the foil bearing carrier. As with respect to the carrier 16 of the previous embodiment, the carrier 36 of this embodiment can be formed from a flat sheet and later formed into a tubular element by rolling and then securing together the ends of the rolled sheet. As illustrated in FIG. 6, the foil bearing carrier 36 is shown as a flat sheet having ends 50 and 52. The still flat stiffener elements 38 can be sheared in the flat sheet by side cuts 40 and 42 and end cut 44 with enlarged openings 46 formed at both ends and at opposite sides. The spring-like stiffener element 38' can then be formed by stamping as shown in the right-hand portion of FIG. 6.

Figure 7:
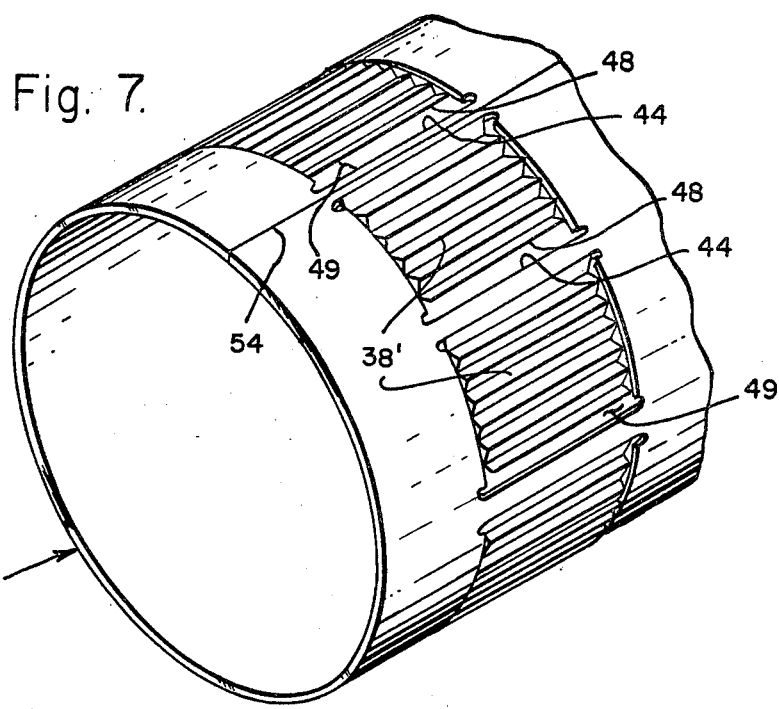
FIG. 7 is a perspective view of the alternate bearing carrier of FIG. 6 formed into a cylindrical configuration.

Forming the wavy stiffener element 38' will leave an opening between the end thereof and the shear line 44 which provides a gap 49 between the stiffener end 48 and shear line 44. The flat plate can then be rolled or otherwise formed into a tubular form with ends 50 and 52 brazed or otherwise joined at parting line 54 as shown in FIG. 7.

Figure 8:
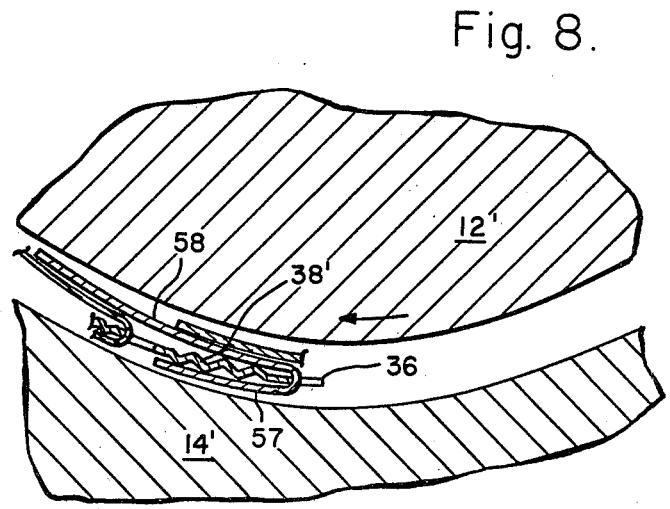
FIG. 8 is an enlarged fragmentary cross-sectional view of a foil journal bearing having the alternate bearing carrier of FIGS. 6 and 7.
Figure 9:
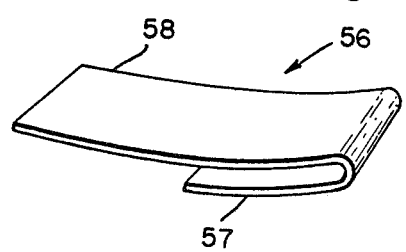
FIG. 9 is a perspective view of an individual hairpin foil for the alternate bearing carrier of FIGS. 6, 7 and 8.

The individual hairpin foils 56 having elongated overfoil 58 and shortened underfoil 57 are illustrated in FIG. 9 and can be inserted into the opening 49 at the end of the stiffener element 38' as shown in FIG. 8. The stiffener element 38' provides the preload required for the overfoil 58 of the hairpin foil 56.

The present invention provides a convenient method of mounting a plurality of individual bearing foils between two relatively movable elements in which the foils are first placed into an assembly which is then inserted between the two relatively movable elements. Once the individual foils are placed or snapped onto the bearing carrier they no longer have to be handled individually and it is only the bearing carrier including the foils which is then placed between the two relatively movable elements such as a shaft and bushing. Not only is this a convenient way to handle and mount the individual foils, it is significant that there is no requirement that any slots or grooves be machined or otherwise formed in one of the bearing surfaces. In this manner the foil bearing becomes much like a rolling contact bearing in that it can be treated as an assembly which is placed between two relatively movable elements.

While a number of specific embodiments of this invention have been illustrated and described, it is to be understood that these are provided by way of example only and that the invention is not to be construed as being limited thereto but only by the scope of the following claims.

What I claim is:

1. A fluid bearing comprising:
a tubular bushing;
a rotatable shaft supportively positioned within said bushing;
a tubular bearing carrier mounted within said bushing around said rotatable shaft, said tubular bearing carrier having at least one circumferential row of a plurality of compliant spring-like stiffener elements and an opening through the entire thickness of the bearing carrier between each of said plurality of compliant spring-like stiffener elements; and
a plurality of compliant hairpin foils removably disposed on said bearing carrier with an individual foil mounted on each spring-like stiffener element.

2. A fluid bearing comprising:
a pair of members arranged for relative rotation with respect to one another, one of said pair of members adapted to rotatably support the other; and
a tubular foil bearing carrier including a plurality of integral axially extending bars arranged around the circumference thereon with through slots therebetween, said bearing carrier disposed between said pair of members and having a defined spacing between each of said pair of members and substantially prevented from movement with respect to one of said pair of members, said bearing carrier including an overlapping plurality of compliant hairpin foil removably disposed thereon, each of the plurality of hairpin foils having an integral underfoil and overfoil, wherein said underfoil generally extends between said bearing carrier and said one of the pair of members, and said overfoil generally extends between said bearing carrier and the other of said pair of members.

3. A fluid bearing comprising:
a pair of members arranged for relative rotation with respect to one another, one of said pair of members adapted to rotatably support the other; and
a tubular foil bearing carrier including a pair of outer tubular rims and a plurality of equally spaced, axially extending integral bars extending therebetween for mounting compliant hairpin foils, said bearing carrier disposed between said pair of members and having a defined spacing between each of said pair of members and substantially prevented from movement with respect to one of said pair of members, said bearing carrier including an overlapping plurality of complaint hairpin foils removably mounted on said bars, each of the plurality of hairpin foils having an integral underfoil and overfoil, wherein said underfoil generally extends between said bearing carrier and said one of the pair of members, and said overfoil generally extends between said bearing carrier and the other of said pair of members.

4. A fluid bearing comprising:
a pair of members arranged for relative rotation with respect to one another, one of said pair of members adapted to rotatably support the other; and
a tubular foil bearing carrier including a pair of outer tubular rims, a central tubular rim, a first plurality of equally space, axially extending, integral bars extending between one of said pair of outer tubular rims and said central tubular rim, and a second plurality of equally spaced, axially extending integral bars extending between said central tubular rim and the other of said pair of outer tubular rim, said bearing carrier disposed between said pair of members and having a defined spacing between each of said pair of members and substantially prevented from axial movement with respect to one of said pair of members, said bearing carrier including an overlapping plurality of compliant hairpin foils removably disposed thereon, each of the plurality of hairpin foils having an integral underfoil and overfoil, wherein said underfoil generally extends between said bearing carrier and said one of the pair of members, and said overfoil generally extends between said bearing carrier and the other of said pair of members.

5. A foil bearing comprising an elongated tubular carrier member and a circumferentially disposed and overlapping purality of individual foil members, each one of said foil members including a first portion radially inward of said carrier member and a second portion overlying said carrier member radially outward thereof, said carrier member defines a circumferential plurality of axially extending integral bars defining through slots therebetween, said foil members being received in said slots.

6. A foil bearing comprising: a first member defining a bore therein, a second relatively rotatable shaft member received in said bore, and an annular carrier member circumscribing said shaft member within said bore, said carrier member including a circumferentially disposed and overlapping multitude of foil members engageable both with said first member and with said second member, said carrier member defines a circumferential row of axially extending bars defining a multitude of slots therebetween, one of said multitude of foil members is disposed in each one of said multitude of slots, each one of said foil members includes an arcuate overfoil adjacent said shaft member, said foil members being bent back upon themselves to extend through a respective slot of said carrier member and defining an arcuate underfoil adjacent said first member, wherein each of said foil members defines an axially extending pocket receiving one of said axially extending bars, and wherein one of said carrier members and said multitude of foil members defines resilient means, in the form of a waveform, for providing radial compliance between said first and said second member.

7. The invention of claim 6 wherein said underfoil and said overfoil of each foil member cooperate to define said pocket.

8. The invention of claim 6 wherein said underfoil of each foil member defines said waveform.

9. The invention of claim 6 further including means for restraining axial and rotational relative movement of said carrier member and said first member while allowing radial relative motion therebetween.

10. The invention of claim 9 wherein said restraining means comprises a radially extending projection carried by one of said first member and said carrier member, said projection being received in a recess defined by the other of said first member and said carrier member.

11. The invention of claim 10 wherein said projection comprises a pin.

12. A fluid bearing comprising:
a bearing support member having an opening therein;
a rotatable shaft operably disposed within the opening of said bearing support member; and
a tubular foil bearing carrier disposed around said rotatable shaft within the opening in said bearing support member and substantially prevented from rotating with respect to said bearing support member, said bearing carrier including a plurality of axially extending integral bars arranged around the circumference thereof with through slots therebetween and a plurality of circumferentially overlapping compliant hairpin foils removably disposed thereon, said plurality of hairpin foils defining a spacing between said bearing carrier and each of said rotatable shaft and bearing support member.

13. A fluid bearing comprising:
a bearing support member having an opening therein;
a rotatable shaft operably disposed within the opening of said bearing support member; and
a tubular foil bearing carrier disposed around said rotatable shaft within the opening in said bearing support member and substantially prevented from rotating with respect to said bearing support member, said bearing carrier including a plurality of circumferentially overlapping compliant hairpin foils removably disposed thereon, a pair of outer tubular rims, and a plurality of equally spaced, axially extending integral bars extending therebetween for mounting the compliant hairpin foils, said plurality of hairpin foils defining a spacing between said bearing carrier and each of said rotatable shaft and bearing support member.

14. A fluid bearing comprising:
a bearing support member having an opening therein;
a rotatable shaft operably disposed within the opening of said bearing support member; and
a tubular foil bearing carrier disposed around said rotatable shaft within the opening in said bearing support member and substantially prevented from rotating with respect to said bearing support member, said bearing carrier including a pair of outer tubular rims, a central tubular rim, a first plurality of equally spaced, axially extending integral bars extending between one of said pair of outer tubular rims and said central tubular rim, and a second plurality of equally spaced, axially extending integral bars extending between said central tubular rim and the other of said pair of outer tubular rims, and a plurality of circumferentially overlapping compliant hairpin foils removably disposed thereon, said plurality of hairpin foils defining a spacing between said bearing carrier and each of said rotatable shaft and bearing support member.

15. The fluid bearing of claim 2, 3, 4, 12, 13, or 14 wherein said hairpin foils include an elongated arcuate overfoil and a shorter arcuate underfoil.

16. The fluid bearing of claim 15 wherein the shorter arcuate underfoil is spring-like.

17. The fluid bearing of claim 16 wherein spring-like shorter arcute underfoil is a waveform.

18. The fluid bearing of claim 2, 3, 4, 12, 13 or 14 wherein the bearing carrier includes at least one circumferential row of compliant spring-like stiffener elements with an axially extending slot at the free end thereof.

* * * * *